US005337080A

United States Patent [19]

O'Connell et al.

[11] Patent Number: 5,337,080

[45] Date of Patent: Aug. 9, 1994

[54] AMORPHOUS SILICON ELECTROGRAPHIC WRITING HEAD ASSEMBLY WITH PROTECTIVE COVER

[75] Inventors: Patrick A. O'Connell; Robert L. Battey, both of Freemont; Maria S. Donigan, Pleasanton; So V. Tien, San Jose; John C. Knights, Palo Alto, all of Calif.

[73] Assignee: Xerox Corporation, Stamford, Conn.

[21] Appl. No.: 53,644

[22] Filed: Apr. 27, 1993

[51] Int. Cl.$^5$ .............................................. G01D 15/06

[52] U.S. Cl. ...................................................... 346/155

[58] Field of Search ............................ 346/155, 76 PH

[56] References Cited

U.S. PATENT DOCUMENTS

| | | | |
|---|---|---|---|
| 4,399,348 | 8/1983 | Bakewell | 346/76 PH X |
| 4,466,020 | 8/1984 | O'Connell . | |
| 4,588,997 | 5/1986 | Tuan et al. | 346/76 PH |
| 4,766,450 | 8/1988 | O'Connell | 346/155 |
| 4,984,040 | 1/1991 | Yap . | |
| 4,998,146 | 3/1991 | Hack . | |
| 5,148,595 | 9/1992 | Doggett et al. | 346/155 X |

*Primary Examiner*—George H. Miller, Jr.
*Attorney, Agent, or Firm*—Lisa M. Yamonaco

[57] ABSTRACT

An amorphous silicon electrographic writing head assembly which reduces the voltage drift in the high voltage driving transistor. The writing head including a substrate having a first surface and a second surface, the first surface having thin film elements fabricated thereon, the first surface having a first region, a second region, and a third region, the first region including an array of writing electrodes, the second region including an array of high voltage transistors, and the third region including interconnecting circuitry for connecting the thin film elements to a connector. The head also includes a first cover glass fixed to the first surface of the array covering the first region and a second cover glass fixed to the first surface of the array covering the third region. Also included are a first side glass fixed to the second surface of the array and a second side glass fixed to the first cover glass and the second cover glass whereby a channel is formed over the second region of the array where the high voltage driving transistor is located.

32 Claims, 6 Drawing Sheets

AMORPHOUS SILICON ELECTROGRAPHIC WRITING HEAD ASSEMBLY WITH PROTECTIVE COVER

BACKGROUND OF THE INVENTION

This invention relates to an electrographic writing head assembly. More particularly, it relates to an amorphous silicon electrographic writing head assembly having a protective cover.

Amorphous silicon, a-Si, technology has found numerous applications because of its low cost and compatibility with low temperature glass substrates. Circuits regularly fabricated with linear dimensions in excess of 30 cm enable the fabrication of large area electronic circuits. Printing systems based upon Ionography and Electrography have also been demonstrated with a-Si. For instance, U.S. Pat. No. 4,466,020 to O'Connell describes an integrated imaging bar having both an array of photosensitive elements and an array of associated marking elements. As will become apparent, the electrographic writing system of the present invention is a good candidate for using large area technology and a-Si fabrication techniques. However, problems can exist when incorporating an a-Si device into an electrographic writing head assembly. The problems and solutions will be discussed below.

In general, the electrographic recording process, for which this invention is particularly applicable, includes the steps of forming an electrostatic latent image upon a recording medium and subsequently making the latent image visible. FIG. 1 shows a typical electrographic plotting system 10 including medium roll 12, medium 14, writing head assembly 16, toning station 18 and drive roller 20. Recording medium 14 is provided in web form and is payed from roll 12 as it is driven by drive roller 20. Medium 14 has a dielectric surface which comes in approximate contact with writing head assembly 16 and a conductive surface (not shown) which is opposite the dielectric surface. Medium 14 may be a coated paper, a polyester based transparent film, or other suitable material on which an electrostatic latent image is formed. Writing takes place in electrography when the potential difference between writing electrodes 28 (also referred to as styli or nibs) of writing head assembly 16 and a biased complementary electrode (not shown) on medium 14 is sufficient to break down the air gap therebetween forming an electrostatic latent image.

As shown in FIG. 1, writing head assembly 16 includes substrate 22 on which an array of thin film transistor elements (not shown) and electrodes 28 are formed. Substrate 22 may be glass with the thin film elements being fabricated thereon utilizing a-Si technology. For mechanical strength and protection, substrate 22 is packaged by being sandwiched between protective insulating overcoatings 24, 26. At the edge of head 16, in contact with the medium, the ends of the conductive electrodes 28 are exposed and are maintained slightly spaced from the surface of the recording medium by an air gap through which selective ionizing electrical discharge takes place forming the electrostatic latent image, as discussed above.

Subsequently, the latent image is made visible during the development step by applying liquid or dry toner to the recording medium using toning station 18. The recording medium is contacted by a thin film of developer material out of which the toner particles are electrostatically attracted to the regions of electrostatic charge on the medium defining the electrostatic latent image hence forming a visible image.

A typical example of thin film transistor elements and electrodes included as part of an electrographic writing array, manufacturable by thin film fabrication techniques, is fully disclosed in U.S. Pat. No. 4,588,997 to Tuan et al. which is hereby incorporated by reference. The thin film components described in Tuan et al. include a linear array of several thousand styli (electrodes) or nibs, a high voltage thin film transistor (HVTFT), and a low voltage thin film transistor (LVTFT). The styli are for generating sequential raster lines of information by means of high voltage electrical discharges across a minute air gap to a conductive electrode. In order to drive selected styli in the array, a multiplexing scheme is used wherein the charge on each stylus is controlled by a low voltage thin film pass transistor which selectively charges and discharges the gate of a thin film high voltage transistor for switching the HVTFT. This scheme allows each stylus to maintain its imposed charge, for substantially a line time, between charges and discharges.

However, it has been shown that the high voltage thin film transistor HVTFT described in Tuan et al. suffers from a characteristic drift in voltage over time causing it to be unstable. U.S. Pat. No. 4,998,146 to Hack discusses this characteristic drift in voltage and offers a solution comprising extending the gate over the channel of the high voltage transistor. U.S. Pat. No. 4,984,040 to Yap also addresses the issue of voltage drift in high voltage thin film transistors and offers a solution by adding a second gate to the high voltage transistor. U.S. Pat. No. 4,998,146 to Hack and U.S. Pat. No. 4,984,040 to Yap, assigned to the same assignee as the present application, are hereby incorporated by reference.

Even though the problem of voltage drift in the high voltage thin film transistors of prior electrographic writing arrays has been addressed, it has been discovered that the problem of voltage drift reappears when constructing an electrographic writing head assembly utilizing an array such as that described in Tuan et al., even when incorporating the improvements suggested by Hack and Yap. In particular, the packaging of the adhesive, used over high voltage transistor circuitry on the array which causes the voltage drift to reappear. Therefore, in light of the above discussion, it would be highly desirable to have an electrographic writing head assembly which utilizes an array having thin film devices in which the voltage drift problem in the high voltage transistor is eliminated.

SUMMARY OF THE INVENTION

In accordance with the present invention, provided is an electrographic writing head assembly which reduces voltage drift in the high voltage transistor. The writing head comprising: a substrate having a first surface and a second surface, the first surface having thin film elements fabricated thereon, the first surface having a first region, a second region, and a third region, the first region including an array of writing electrodes, the second region including an array of high voltage transistors for driving the writing electrodes, and the third region including interconnection circuitry; a first protective member fixed to the first surface and overlying the first region; a second protective member fixed to the first surface and overlying the third region; and a third protective member fixed to the first and the second protective members whereby a channel is formed over the second region. In addition, a fourth protective member can be fixed to the second surface of the substrate.

Also in accordance with the present invention, a drying system can be incorporated with the electrographic writing head which may extend the life of the device.

BRIEF DESCRIPTION OF THE DRAWINGS In the drawings.

DETAILED DESCRIPTION OF THE INVENTION

Figure 1:
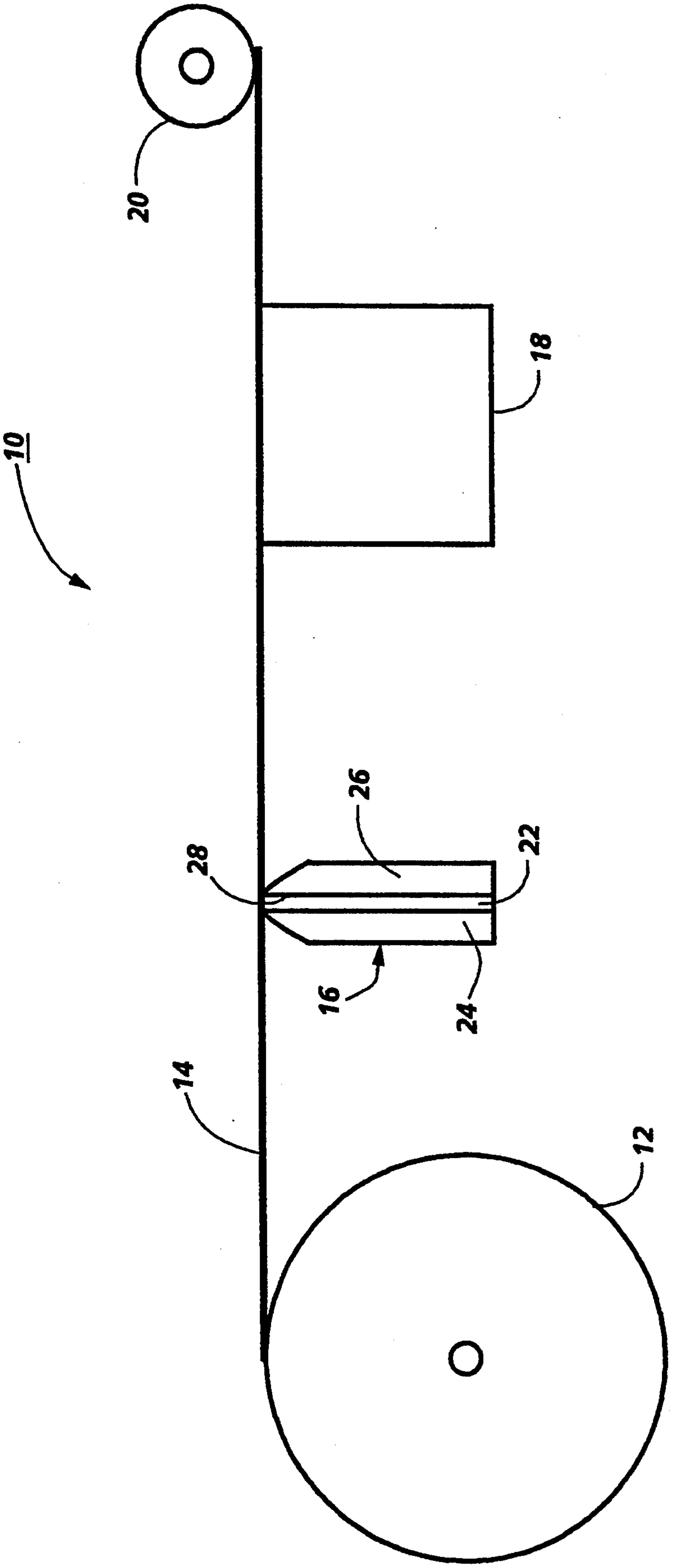
FIG. 1 is a schematic diagram of a typical electrographic plotter.
Figure 2:
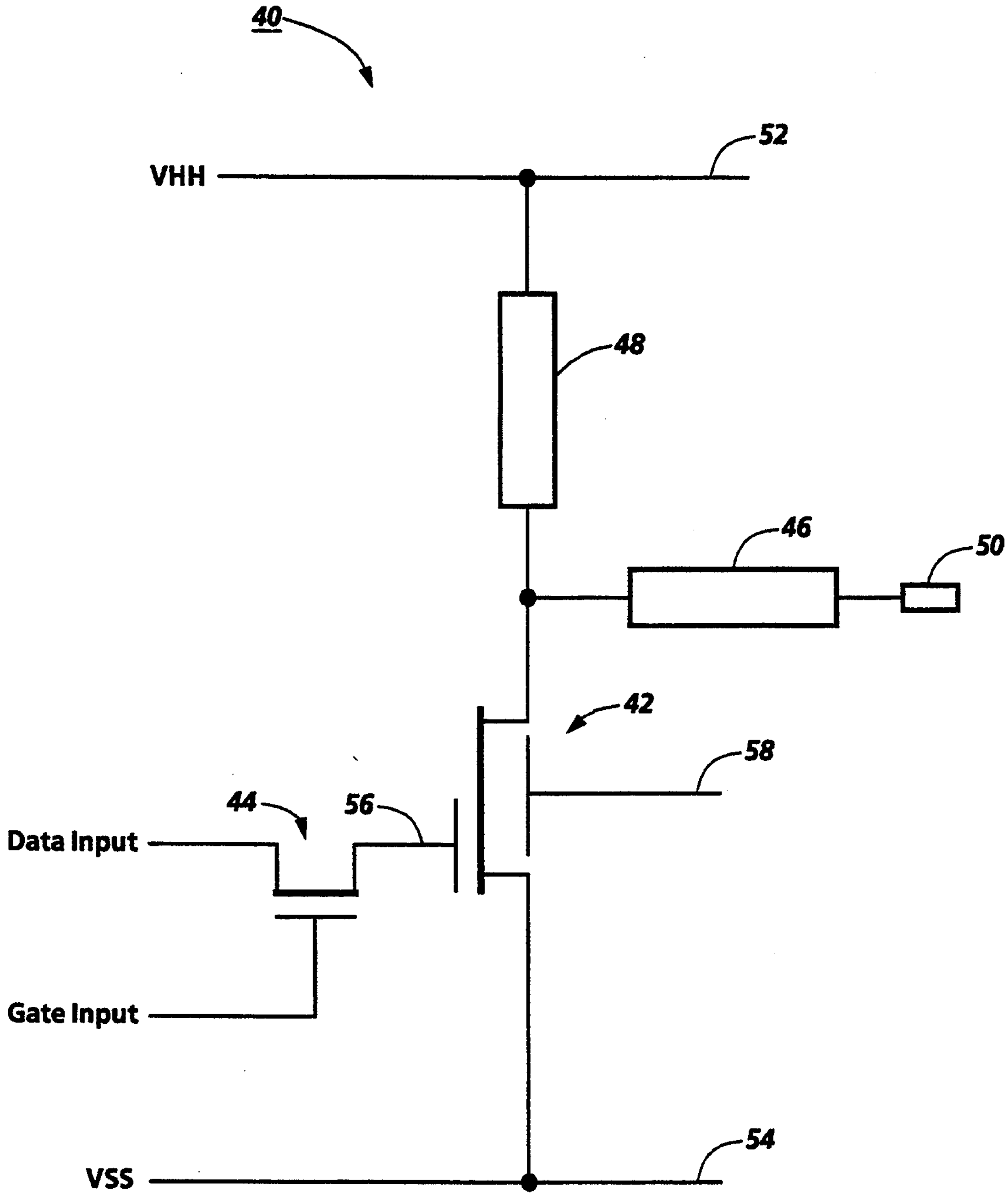
FIG. 2 is schematic diagram of one nib driving circuit on an electrographic writing array utilized in the present invention.

FIG. 2 shows driving circuit 40 of an electrographic writing array for driving one electrode or nib 50. An electrographic writing head comprises a linear array of several thousand nib driving circuits 40. This array can be fabricated, using thin film fabrications techniques, onto a substrate such as glass. Circuit 40 comprises a low voltage transistor 44, high voltage transistor 42, nib pullup resistor 46, pullup resistor 48, and nib 50. Low voltage transistor 44 acts as a latch and provides data to gate 56 of high voltage transistor 42. High voltage transistor 42 provides drive for nib 50 which writes the latent image onto the recording medium. A second gate 58 of high voltage transistor 42 adds stability to the device to reduce drift. Pullup resistor 46 is specifically placed close to nib 50 to aid in the elimination of image defects and is described in U.S. Pat. No. 4,766,450 to O'Connell which is hereby incorporated by reference.

As discussed in the background, circuit 40 exhibits unstable behavior when the array is packaged with a protective cover fixed to the substrate and overlies circuit 40. In particular, it has been found that covering the high voltage transistor causes a voltage shift in the output of the high voltage transistor. The voltage shift will now be described with reference to FIG. 2 and FIG. 3.

Figure 3:
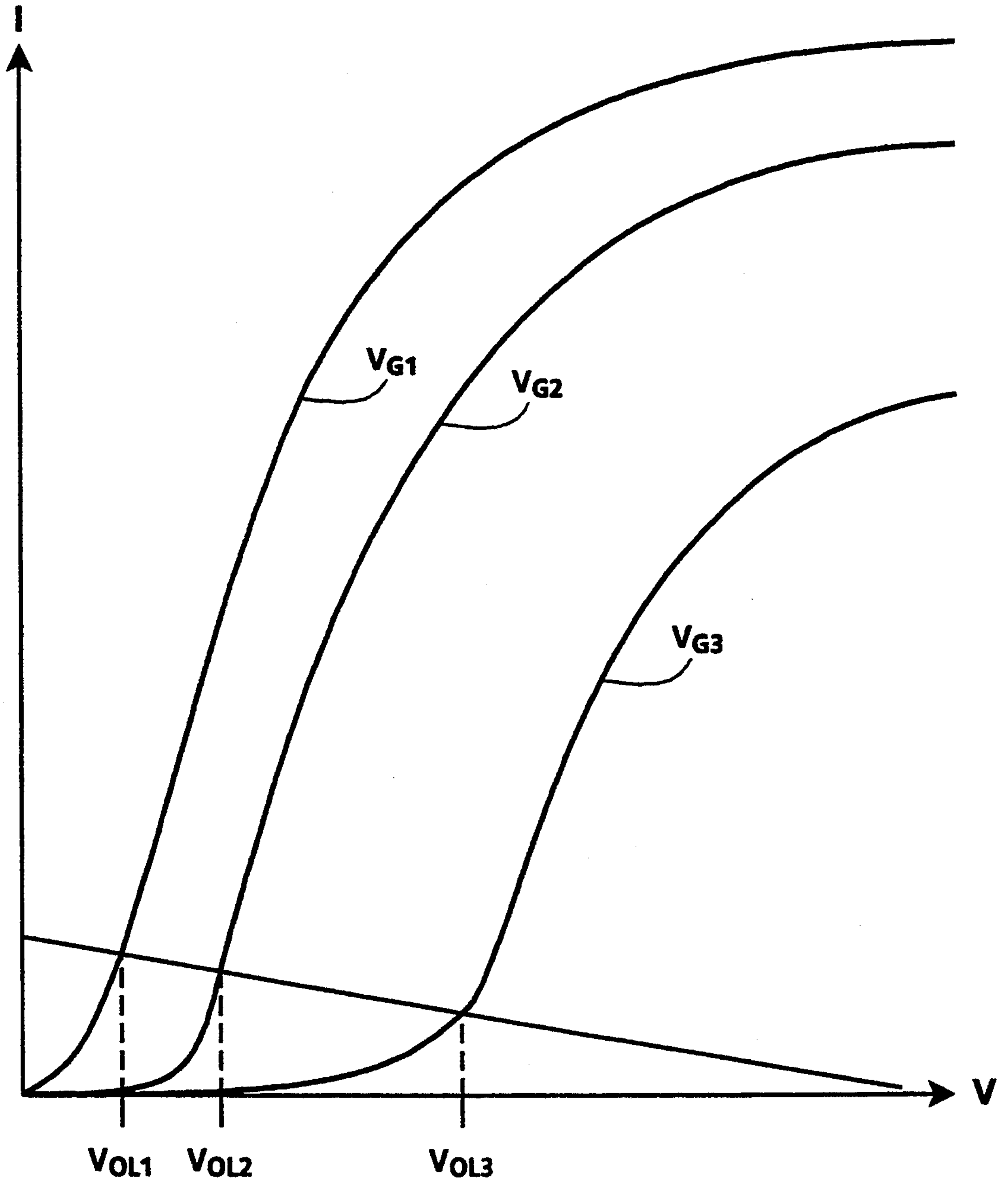
FIG. 3 is a waveform diagram illustrating IV characteristics of the high voltage thin film transistor of FIG. 2.

High voltage transistor 42 and pullup resistor 48 form a simple inverter circuit. When transistor 42 is in the ON state, gate voltage VG is measured. As shown in FIG. 3, the IV (current, voltage) characteristics of transistor 42 in an ideal situation would be represented by curve VG1. Curves VG2 and VG3 represent shifts in these IV characteristics over time. A problem arises from this voltage shift because the overall voltage swing of transistor 42 becomes reduced as the voltage shift increases. In the ideal situation, the transistor voltage swings from supply voltage VSS 54 to supply voltage VHH 52 with the writing voltage being VHH-VSS. However, if a shift in voltage occurs, the writing voltage becomes VHH-VSS-ΔVOL, where ΔVOL represents the amount of voltage shift. In other words, the overall voltage swing is reduced as ΔVOL gets larger and thus, so does the writing voltage. It can be seen from curves VG2 and VG3 that a voltage shift occurs in the lower portion of the curves.

Utilizing loadline L, from curve VG1 voltage VOL1 can be determined. When transistor 42 shifts a few volts, as shown by curve VG2, VOL2 can be determined and ΔVOL is the difference between VOL1 and VOL2. In a similar manner, when the voltage from transistor 42 shifts more dramatically, as shown by curve VG3, VOL3 can be determined and ΔVOL is the difference between VOL1 and VOL3. ΔVOL can be in the several hundred volt range as exemplified by curve VOL3. Typically, 450 V is needed for writing so if ΔVOL is small, e.g. 5 volts, there is little degradation to image quality. However, if ΔVOL is large, e.g. 100 V, then the writing voltage is significantly reduced and an image defect called dropout occurs because writing is not being done with full voltage. Dropout causes image defects such as gaps in solid lines and is totally unacceptable. Therefore, it is necessary to decrease ΔVOL as much as possible to maintain good image quality.

Figure 4:
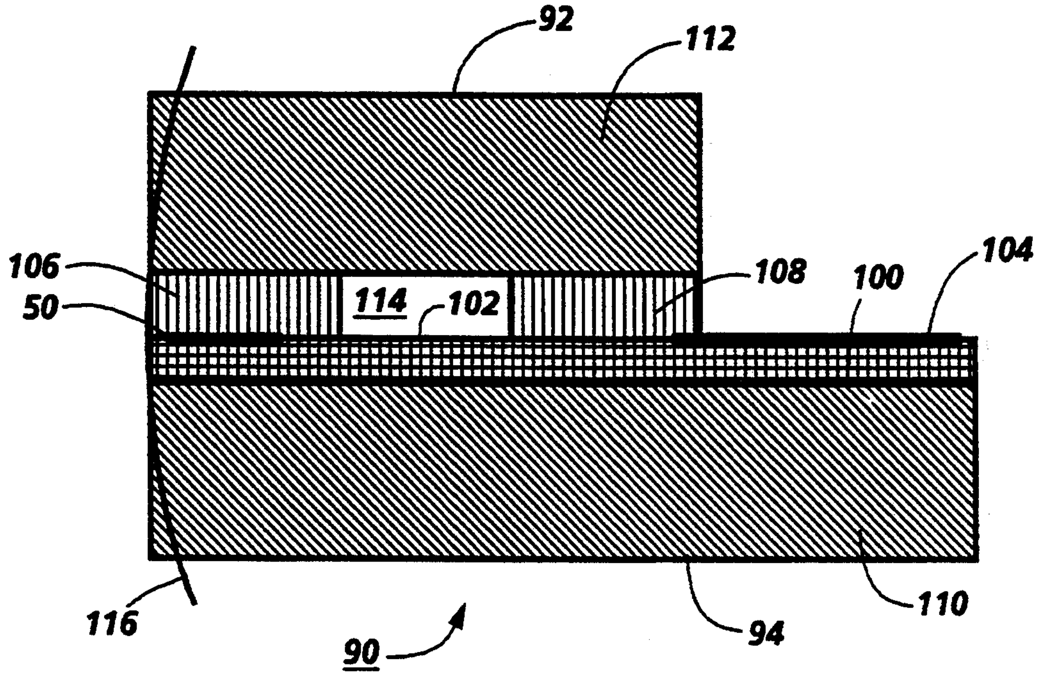
FIG. 4 is a cross sectional view of the electrographic writing head assembly of the present invention.

It has been found that leaving a channel or air gap above the high voltage transistor in the packaged array assembly reduces the output voltage drift and image quality is improved. Referring to FIG. 4, shown is a cross section of electrographic writing head assembly 90. For purposes of explanation, surface 92 of assembly 90 is referred to as the top surface and surface 94 is referred to as the bottom surface. Assembly 90 includes substrate 100 upon which an array of circuit elements, including nibs 50, connectors 104, and thin film transistor elements. Substrate 100 may be made of glass commercially available as Corning 7059® (Corning, N.Y.).

Assembly 90 further includes first split cover glass 106 and second split cover glass 108 which are both protective members. The pair of split cover glasses 106, 108 are fixed at surface 102 of substrate 100 creating channel or air gap 114 therebetween. As will be described in detail below with reference to FIG. 5, precision placement of the split cover glasses 106, 108 creating air gap 114 over the high voltage transistor section of the circuitry on array 100 is important.

Fixed to the underside of substrate 100 is bottom side glass 110 which is also a protective member. Bottom side glass 110 must have the same thermal properties as the glass used for substrate 100, (however it need not have the same electrical properties) so that expansion and contraction of the assembly will take place as a unit. Furthermore, bottom side glass 110 has approximately the same width as substrate 100 adding extra mechanical support.

Fixed to split cover glasses 106, 108 is top side glass 112. As with bottom side glass 110, top side glass 112 must have the same thermal properties of the glass used for substrate 100, however it need not have the same electrical properties. Top side glass 112 has a width which is approximately equal to the size of the two split glasses plus the air gap. The shorter top side glass allows connectors 104 on substrate 100 to be available to interface with other electronic components a via circuit board (not shown) in the electrographic plotter.

Once assembly of writing head assembly 90 is complete, the writing end is ground to a radius indicated by radius line 116. The grinding process produces a smooth surface for the writing medium to come in contact with writing assembly 90 cresting at nibs 50.

Figure 5:
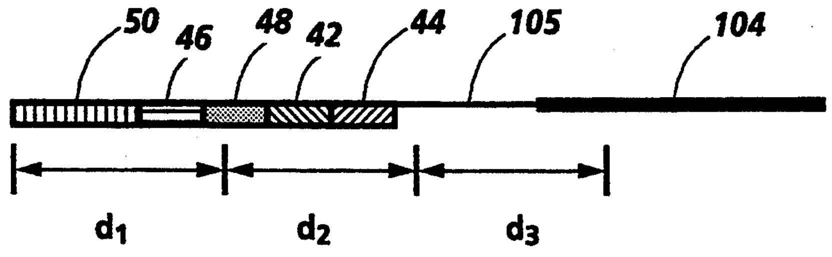
FIG. 5 is a schematic representation showing the relationship between the circuit elements on the array with placement of the cover glass for the electrographic writing head assembly of the present invention.

FIG. 5 shows a schematic representation of circuit elements on surface 102 of substrate 100. Similar reference numerals as those used in FIGS. 2 and 4 are used to indicate similar elements including nib 50, nib pullup resistor 46, pullup resistor 48, high voltage transistor 42, low voltage transistor 44, interconnect line 105 and connector 104. A first region shown as distance $d_1$ indicates the region covered by first split cover glass 106. As shown, distance $d_1$ includes writing stylus 50, nib pullup resistor 46, and a portion of pullup resistor 48.

A second region shown as distance $d_2$ indicates the area of the channel or air gap 114 left between the two spit cover glasses 106, 108. As shown, distance $d_2$ includes a portion of pullup resistor 48, high voltage transistor 42 and low voltage transistor 44. It should be noted that high voltage transistor 42 is the most important element falling within air gap 114. Finally, a third region shown as distance $d_3$ indicates the placement of second split cover glass 108 showing a slight overlap with connectors 104. The uncovered portion of connectors 104 need remain uncovered to enable interfacing with other electronics in the plotter as previously discussed.

Although an array has been described above with the elements set forth in FIG. 2, it can be appreciated that other combinations of circuit elements may also be fabricated upon surface 102 of substrate 100 and that the present invention is not intended to be limited to the elements set forth in FIG. 2. An alternate example of an integrated thin film transistor writing array applicable to the present invention is described in copending application Ser. No. 07/871,250 to Da Costa et al.

Figure 6:
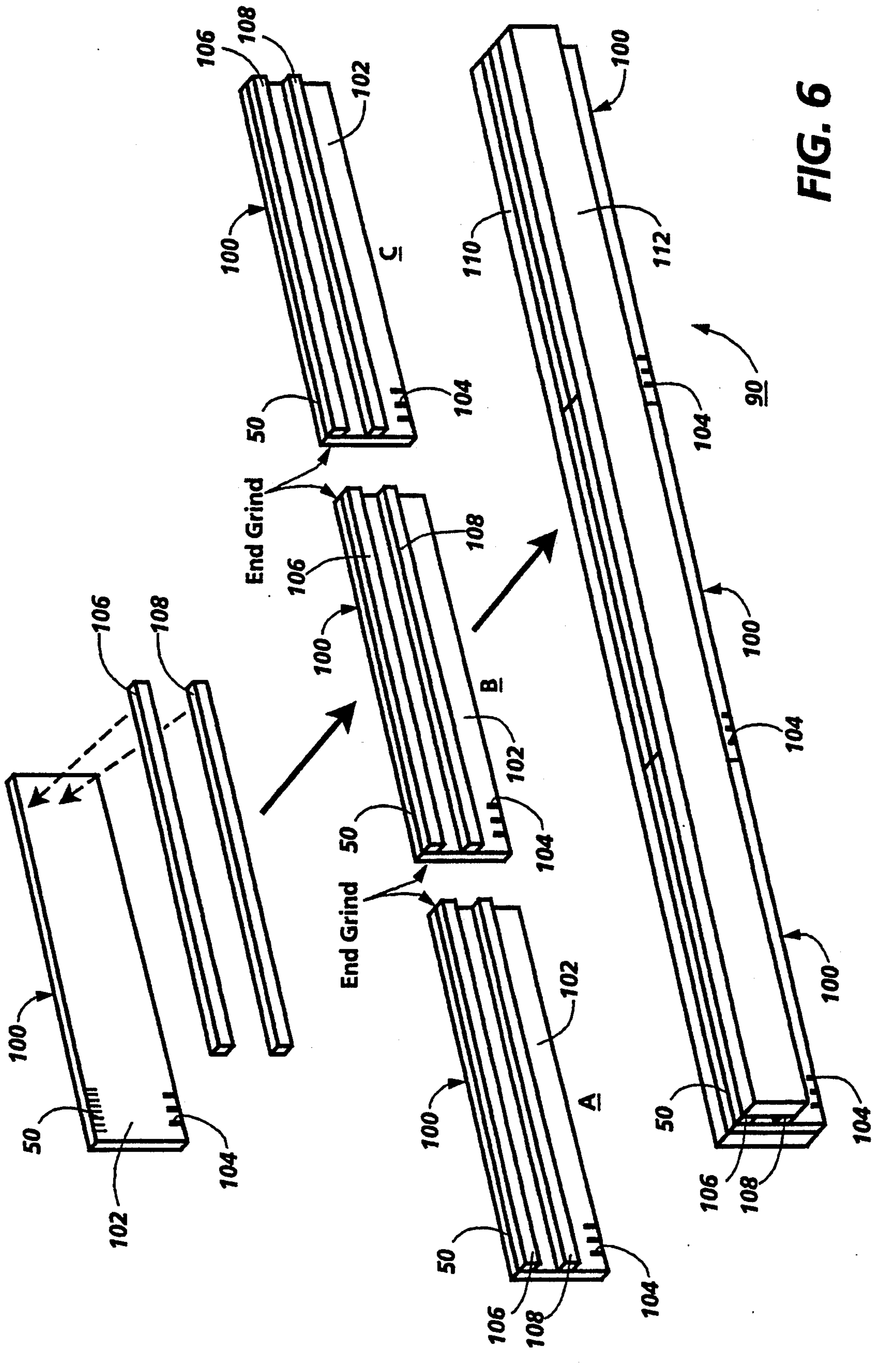
FIG. 6 is a schematic representation of the assembly steps in making the electrographic writing head assembly of the present invention.

FIG. 6 shows the assembly procedure of making a thirty-six inch (approximately) electrographic writing head assembly. Although a thirty-six inch assembly is being described, it can be appreciated that an assembly of any length can be produced using the following procedure. Starting with substrate 100, first split cover glass 106 and second split cover glass 108 are fixed to its surface 102. An UV (ultraviolet) curable adhesive can be used as the fastening agent, although the invention is not limited to such an adhesive. In this particular case where an array is approximately 12 inches in length, three such arrays are fitted with split cover glass. Next, as shown, the ends of the arrays with the cover glass are ground in order to accommodate butting together the shorter arrays to form one long array. The grinding process is precise enough to allow for no deviation in the nib to nib spacing at the seam between adjacent arrays.

To complete head assembly 90, the three arrays with cover glass are fixed between bottom side glass 110 and top side glass 112 using an adhesive and clamping. Once complete, the grinding of the nib section of the assembly is performed as described with reference to FIG. 4.

Even though it has been found that the best solution for overcoming the voltage shift in the high voltage transistor was to leave an air gap above the transistor, the air gap allows moisture in. The moisture permeates through the adhesive and causes corrosion thereby causing the circuit and the transistors to fail over time.

Therefore, it is desirable to eliminate the moisture within the air gap.

Figure 7:
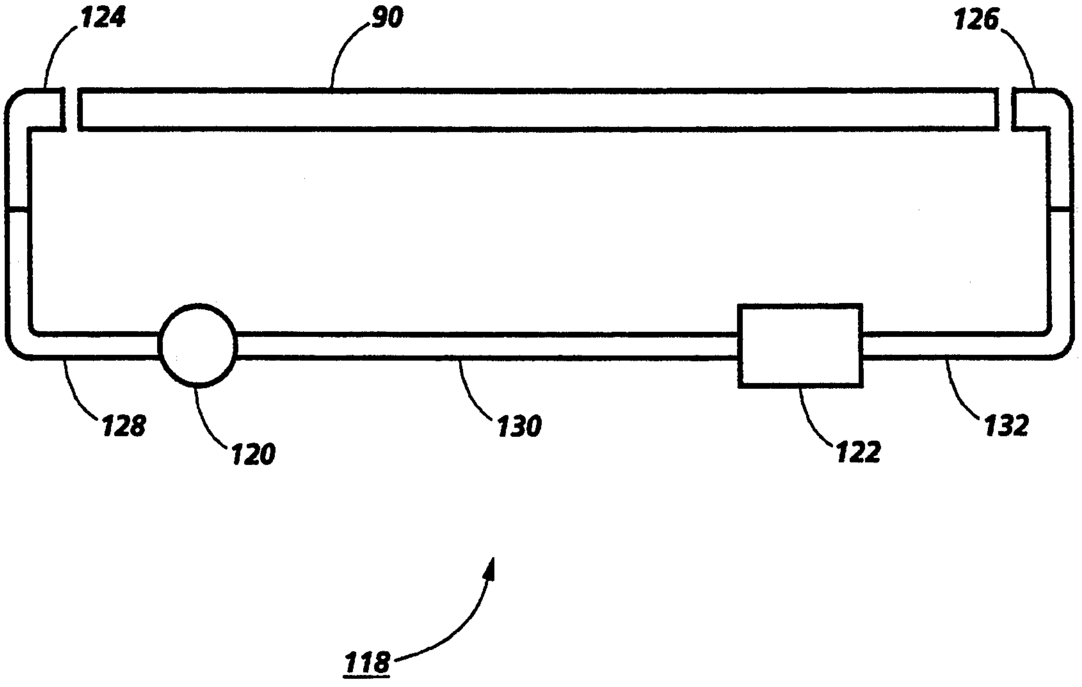
FIG. 7 is a schematic representation of a drying system used in conjunction with electrographic writing head assembly of the present invention.

Referring to FIG. 7, a drying system 118 has been incorporated to isolate the air gap from atmospheric conditions. Long range life tests of the writing head assembly utilizing the drying system at low humidity showed no problems with either voltage shift or corrosion in the high voltage transistor area. Although air has been used to describe the gas in the channel formed above the high voltage transistor, it can be appreciated that other gasses may be utilized in that channel.

Drying system 118 is a closed loop system including end caps 124, 126, air pump 120, desiccant canister 122 and tubing 128, 130, 132. Electrographic writing head assembly 90 is sealed into drying system 118 by using an adhesive to seal end caps 124 and 126 to tubes 128 and 132 respectively. Pump 120 runs the entire time the plotter is running keeping air in the gap dry by driving it through the desiccant and drying itself out. Provided the air leak rates are low enough, the drying system should last for years. It can be appreciated that although the use of an adhesive to seal the end caps has been disclosed, other methods of providing a seal between the end caps and the array can be envisioned.

While the invention has been described with reference to the structures disclosed, it is not confined to the details set forth, but is intended to cover such modifications or changes as may come within the scope of the following claims:

We claim:

1. An amorphous silicon electrographic writing head assembly, comprising:

- a substrate having a first surface and a second surface, said first surface having thin film elements fabricated thereon, said first surface having a first region, a second region, and a third region, said first region including an array of writing electrodes, said second region including an array of high voltage transistors for driving said writing electrodes, and said third region including interconnection circuitry;
- a first protective member fixed to said first surface and overlying said first region;
- a second protective member fixed to said first surface and overlying said third region; and
- a third protective member fixed to said first and said second protective members whereby a channel is formed over said second region.

2. An amorphous silicon writing head assembly according to claim 1 wherein said substrate is glass.

3. An amorphous silicon writing head assembly according to claim 2 wherein said first, second and third protective members are glass having the same thermal properties as said substrate.

4. An amorphous silicon writing head assembly according to claim 3 further comprising a drying system for removing moisture from said channel above said second region.

5. An amorphous silicon writing head assembly according to claim 4 wherein said drying system is a closed system.

6. An amorphous silicon writing head assembly according to claim 4 whereby said drying system includes a pump for moving a gas through said channel and through a desiccant.

7. An amorphous silicon writing head assembly according to claim 6 wherein said drying system is a closed system.

8. An amorphous silicon writing head assembly according to claim 2 further comprising a drying system for removing moisture from said channel above said second region.

9. An amorphous silicon writing head assembly according to claim 8 wherein said drying system is a closed system.

10. An amorphous silicon writing head assembly according to claim 8 whereby said drying system includes a pump for moving a gas through said channel and through a desiccant.

11. An amorphous silicon writing head assembly according to claim 10 wherein said drying system is a closed system.

12. An amorphous silicon writing head assembly according to claim 1 wherein said first, second and third protective members are glass.

13. An amorphous silicon writing head assembly according to claim 1 further comprising a fourth protective member fixed to said second surface of said substrate.

14. An amorphous silicon writing head assembly according to claim 13 wherein said first, second, third and fourth protective members are glass.

15. An amorphous silicon writing head assembly according to claim 13 wherein said substrate is glass.

16. An amorphous silicon writing head assembly according to claim 15 wherein said first, second, third, and fourth protective members are glass having the same thermal properties as said substrate.

17. An amorphous silicon writing head assembly according to claim 16 further comprising a drying system for removing moisture from said channel above said second region.

18. An amorphous silicon writing head assembly according to claim 17 wherein said drying system is a closed system.

19. An amorphous silicon writing head assembly according to claim 17 whereby said drying system includes a pump for moving a gas through said channel and through a desiccant.

20. An amorphous silicon writing head assembly according to claim 19 wherein said drying system is a closed system.

21. An amorphous silicon writing head assembly according to claim 15 further comprising a drying system for removing moisture from said channel above said second region.

22. An amorphous silicon writing head assembly according to claim 21 wherein said drying system is a closed system.

23. An amorphous silicon writing head assembly according to claim 21 whereby said drying system includes a pump for moving a gas through said channel and through a desiccant.

24. An amorphous silicon writing head assembly according to claim 23 wherein said drying system is a closed system.

25. An amorphous silicon writing head assembly according to claim 13 further comprising a drying system for removing moisture from said channel above said second region.

26. An amorphous silicon writing head assembly according to claim 25 wherein said drying system is a closed system.

27. An amorphous silicon writing head assembly according to claim 25 whereby said drying system includes a pump for moving a gas through said channel and through a desiccant.

28. An amorphous silicon writing head assembly according to claim 27 wherein said drying system is a closed system.

29. An amorphous silicon writing head assembly according to claim 1 further comprising a drying system for removing moisture from said channel above said second region.

30. An amorphous silicon writing head assembly according to claim 29 wherein said drying system is a closed system.

31. An amorphous silicon writing head assembly according to claim 29 whereby said drying system includes a pump for moving a gas through said channel and through a desiccant.

32. An amorphous silicon writing head assembly according to claim 31 wherein said drying system is a closed system.

* * * * *